United States Patent [19]

Russell et al.

[11] Patent Number: 5,453,603

[45] Date of Patent: Sep. 26, 1995

[54] METHOD AND APPARATUS FOR DECODING BI-PHASE ENCODED DATA

[75] Inventors: Roger K. Russell; Mark W. Voth, both of Indianapolis, Ind.

[73] Assignee: Best Lock Corporation, Indianapolis, Ind.

[21] Appl. No.: 177,227

[22] Filed: Jan. 4, 1994

[51] Int. Cl.$^6$ .................................................. G06K 7/08
[52] U.S. Cl. ............................................ 235/449; 360/43
[58] Field of Search .................................... 235/382, 449; 360/43, 2; 341/54

[56] References Cited

U.S. PATENT DOCUMENTS

| | | |
|---|---|---|
| 3,549,804 | 12/1970 | Greenspan et al. . |
| 4,053,736 | 10/1977 | Banka et al. . |
| 4,184,179 | 1/1980 | Deming ............................ 360/44 |
| 4,242,755 | 12/1980 | Gauzan . |
| 4,264,934 | 4/1981 | Mattes . |
| 4,357,707 | 11/1982 | Delury . |
| 4,626,670 | 12/1986 | Miller . |
| 4,912,310 | 3/1990 | Uemura ............................ 235/380 |

*Primary Examiner*—Donald Hajec
*Assistant Examiner*—Karl D. Frech
*Attorney, Agent, or Firm*—Barnes & Thornburg

[57] ABSTRACT

A method and apparatus are provided for decoding bi-phase encoded data. The apparatus performs the steps of establishing a predicted bit cell length for a bit cell, detecting a leading clocking edge transition of the bit cell, detecting a first edge transition after the leading clocking edge transition, and calculating a first time interval from the leading clocking edge transition to the first detected edge transition. The apparatus also performs the steps of detecting a second edge transition after the leading clocking edge transition, calculating a second time interval from the leading clocking edge transition to the second detected edge transition, comparing both the first time interval and the second time interval to the predicted bit cell length, assigning a logical zero value to the bit cell if the first time interval is closer to the predicted bit cell length than the second time interval, and assigning a logical one value to the bit cell if the second time interval is closer to the predicted bit cell length than the first time interval.

26 Claims, 3 Drawing Sheets

METHOD AND APPARATUS FOR DECODING BI-PHASE ENCODED DATA

BACKGROUND AND SUMMARY OF THE INVENTION

This invention relates to a method and apparatus for decoding bi-phase encoded data such as data from a magnetic stripe card. More particularly, the present invention decodes data stored on magnetic stripe cards to control operation of another device, such as an electronic lock.

Magnetic stripes on magnetic stripe cards have magnetically encoded data in the form of a series of flux reversals on the stripes. These flux reversals have two functions. A first function is a clocking transition, and a second function is a data transition. The linear distance between two clocking transitions on a stripe is called a bit cell. When the bit cell contains no intermediate data transition or flux reversal, the bit cell is assigned the binary value zero. When the bit cell includes an intermediate flux reversal or data transition between the two clocking transitions, the bit cell is assigned the binary value one.

Problems occur as the speed at which the stripes move through the decoder varies. As the speed at which the magnetic stripe card is moved through the read head changes, the time between flux reversals representing length of the bit cell also changes. Therefore, one key to decoding data on magnetic stripe cards is to determine the bit cell length so that intermediate data transitions signifying a logical value one are not confused with an end transition of the bit cell. Since the bit cell both begins and ends with a clocking transition, it is difficult to determine whether a given transition represents the closing clocking transition of a zero value cell, or the interim data transition in a logical one value cell.

Prior art decoders use the concept of averaging at least the preceding two bit cell lengths to estimate the probable length of the current bit cell. One prior art decoder disclosed in U.S. Pat. No. 4,626,670 to Miller calculates two-thirds of the average time length and then uses this value as an optimum test time for determining whether a data transition has occurred in the current bit cell. If a data transition has occurred before the optimum test time expires, the decoder disclosed in the '670 patent assumes the bit cell has a logic value one. If no data transition has occurred prior to the optimum testing time, the '670 patent decoder assumes that the bit cell has a logic value zero.

Two problems associated with decoding data from magnetic stripe cards include acceleration and jitter. As the magnetic card is accelerated through a read head, time intervals between detected flux reversals change. Jitter results from inconsistencies in the magnetic recording material. Both acceleration and jitter can result in decoding errors. However, jitter causes substantially more problems than acceleration when decoding data from magnetic stripe cards. An object of the apparatus and method of the present invention is to reduce inaccuracies in decoding data from magnetic stripe cards caused by jitter.

The decoder of the present invention does not calculate the optimum time to test whether a data transition has occurred within the current bit cell from a predicted bit cell time length. Instead, the decoder of the present invention uses a novel "look-ahead" approach to decoding bi-phase data. In one embodiment of the present invention, the decoder uses the length of the previous bit cell as a predicted bit cell length for the next bit cell to determine whether the next edge transition or whether the next two edge transitions are most likely to be a bit cell. If the length from a previous edge transition to the next edge transition is closer to the predicted bit cell length, then the bit cell is assigned a logic value zero. If the length from the previous edge transition to the second edge transition is closer to the predicted cell length, then the bit cell is assigned a logic value one.

The decoder of the present invention advantageously checks the lengths of both of the next two edge transitions in order to choose the length which most accurately reflects the predicted bit cell length. Therefore, the present invention uses a quantitative approach to decode data from the magnetic stripe cards, as opposed to a predictive approach disclosed in the '670 patent.

According to one aspect of the present invention, a method is provided for decoding bi-phase encoded data. The method includes the steps of establishing a predicted bit cell length for a bit cell, detecting a leading clocking edge transition of the bit cell, detecting a first edge transition after the leading clocking edge transition, and calculating a first time interval from the leading clocking edge transition to the first detected edge transition. The method also includes the steps of detecting a second edge transition after the leading clocking edge transition, calculating a second time interval from the leading clocking edge transition to the second detected edge transition, comparing both the first time interval and the second time interval to the predicted bit cell length, assigning a logical zero value to the bit cell if the first time interval is closer to the predicted bit cell length than the second time interval, and assigning a logical one value to the bit cell if the second time interval is closer to the predicted bit cell length than the first time interval.

In one embodiment of the present invention, the step of establishing the predicted bit cell length includes the steps of calculating an average length of a plurality of previous bit cells and setting the predicted bit cell length equal to the average length. In another embodiment, the step of establishing the predicted bit cell length includes the steps of calculating a length of a previous bit cell and setting the predicted bit cell length equal to the length of the previous bit cell.

In the illustrated embodiment, the method further includes the steps of setting a predicted bit cell length for a next bit cell equal to the first time interval if the bit cell is assigned a logical zero value during the assigning step. The method also includes the step of setting a predicted bit cell length for a next bit cell equal to the second time interval if the bit cell is assigned a logical one value during the assigning step.

The illustrated method includes the steps of setting the first detected edge as the leading clocking transition for a next bit cell and setting the second detected edge as the first detected edge for the next bit cell if the first time interval is closer to the predicted bit cell length than the second time interval. The method also includes the step of setting the second detected edge as the leading clocking transition for a next bit cell if the second time interval distance is closer to the predicted bit cell length than the first time interval.

According to another aspect of the present invention, an apparatus is provided for decoding bi-phase encoded data. The apparatus includes a read head for reading data from a magnetic stripe card. The read head generates an output signal including a plurality of edge transitions corresponding to a plurality of flux reversals on the magnetic stripe card. The apparatus also includes means for detecting a leading clocking edge transition of a bit cell, a first edge transition after the leading clocking edge transition, and a second edge transition after the leading clocking edge transition from the output signal. The apparatus further includes means for establishing a predicted bit cell length for a bit cell, means for calculating a first distance from the leading clocking edge transition to the first detected edge transition, means for calculating a second distance from the leading clocking edge transition to the second detected edge transition, and means for comparing both the first distance and the second distance to the predicted bit cell length. The apparatus still further includes means for assigning a binary data value to the bit cell. The assigning means assigns a logical value zero to the bit cell if the first distance is closer to the predicted bit cell length than the second distance. The assigning means assigns a logical value one to the bit cell if the second distance is closer to the predicted bit cell length than the first distance.

In one illustrated embodiment, the means for establishing a predicted bit cell length includes means for calculating an average length of a plurality of previous bit cells, and means for setting the predicted bit cell length equal to the average length. In another illustrated embodiment, the means for establishing a predicted bit cell length includes means for calculating a length of a previous bit cell, and means for setting the predicted bit cell length equal to the length of the previous bit cell.

In the illustrated embodiment, the apparatus includes means for setting a predicted bit cell length for a next bit cell equal to the first distance if the assigning means assigns a logical zero value to the bit cell. The apparatus also includes means for setting a predicted bit cell length for a next bit cell equal to the second distance if the assigning means assigns a logical one value to the bit cell.

Also in the illustrated embodiment, the apparatus includes means for setting the first detected edge as the leading clocking transition for a next bit cell and means for setting the second detected edge as the first detected edge for the next bit cell if the assigning means assigns a logical zero value to the bit cell. The apparatus also includes means for setting the second detected edge as the leading clocking transition for a next bit cell if the assigning means assigns a logical one value to the bit cell.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
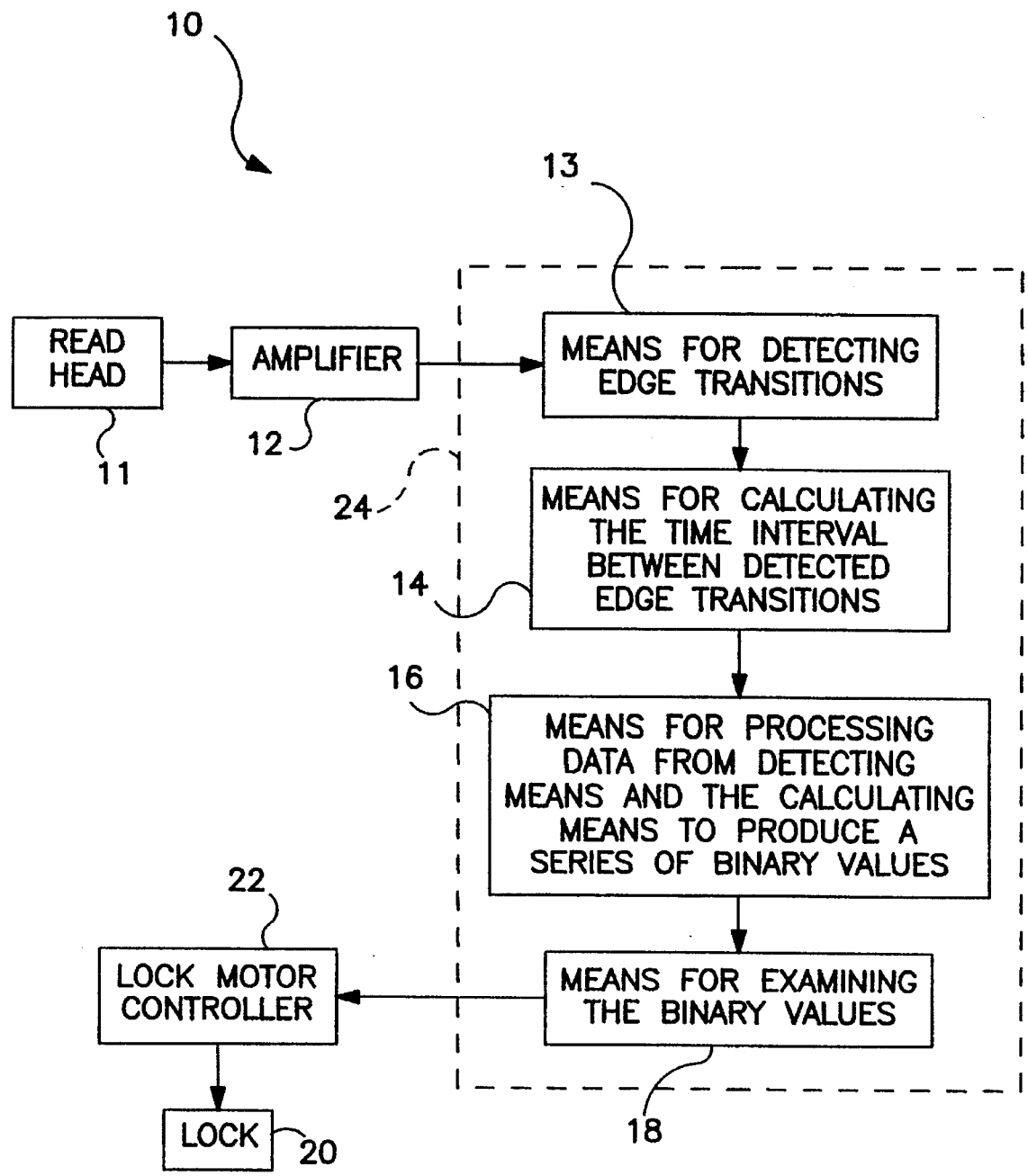
FIG. 1 is a block diagram illustrating the structural elements of the apparatus for decoding bi-phase encoded data from a magnetic stripe for use to control locking and unlocking of an electronic lock.

Referring now to the drawings, FIG. 1 is a block diagram of the structural components of an apparatus 10 for decoding bi-phase encoded data of the present invention. A conventional magnetic stripe card read head 11 is provided. Illustratively, read head 11 is a 7091 BM read head available from Xico, Inc. in Santa Monica, Calif. Read head 11 detects magnetically encoded bi-phase data which consists of a series of flux reversals on a magnetic stripe card (not shown). The output from read head 11 is coupled to an amplifier 12 to differentiate and amplify the output signal from read head 11. An output signal from amplifier 12 is a series of square waves which provide a series of voltage changes or transitions at time intervals corresponding to the distance between flux reversals on the magnetic stripe card and to the speed of which the card moves through read head 11. The output of amplifier 12 is coupled to means for detecting edge (voltage) transitions illustrated in block 13. The detecting means is coupled to means for calculating time intervals between the edge (voltage) transitions as illustrated at block 14. In the illustrated embodiment of the present invention, the detecting means 13 and calculating means 14 are included in a M68HC11 Evaluation Board Revision C, with RAM installed in the U4 socket available from Motorola.

An output from calculating means 14 is coupled to means for processing the data from the detecting means and the calculating means to produce a series of binary values corresponding to the encoded data values on the magnetic stripe card as illustrated at block 16. In the illustrated embodiment, the processing means is an IBM AT compatible personal computer having a serial input port configured as COM1. The personal computer includes Microsoft Basic compiler software (either PDS or VBDOS), a generalized communication package such as PROCOMM, and a file editor. The personal computer is programmed with software for processing the output from the detecting means 13 and the calculating means 14 to produce a series of binary values as discussed in detail below. Apparatus 10 further includes means 18 coupled to the processing means 16 for examining the binary values to determine whether the particular magnetic stripe card is authorized to open a lock 20. In the illustrated embodiment, the examining means 18 compares the series of binary values generated by the processing means 16 to a table of authorized values. Examining means 18 is therefore the computer (or microcontroller) which compares the generated binary values to values stored in memory. If the particular magnetic stripe card is authorized to open lock 20, a control signal is sent from examining means 18 to lock motor controller 22 so that lock motor controller 22 opens lock 20. Illustratively, lock 20 and lock motor controller 22 are an Electric Access-V-Series lock system available from Best Lock Corporation in Indianapolis, Ind.

It is understood that the detecting means 13, the calculating means 14, the processing means 16, and the examining means 18, may all be combined in a single computing device 24. For instance, computing device 24 may be a M68HC11F1 or a 68HC16 microcontroller available from Motorola. Computing device 24 may also be a 8051 or 8031 microcontroller available from Dallas Semiconductor Corporation. An internal clock cycle for computing device 24 must be at least 4 Mhz. It is also understood that computing device 24 may also be an ASIC specifically designed to perform the steps of detecting means 13, the calculating means 14, processing means 16, and examining means 18.

Figure 2:
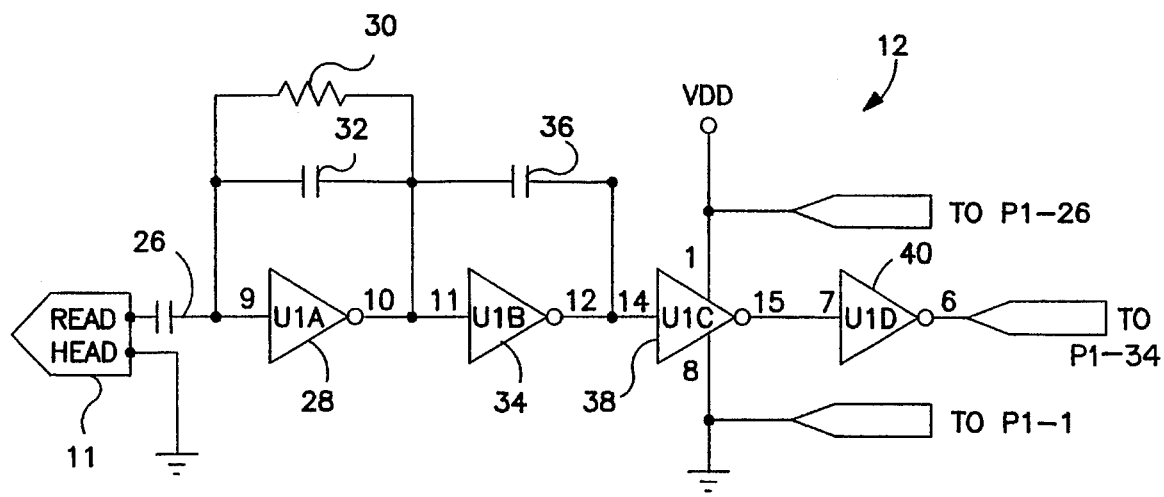
FIG. 2 is a schematic diagram illustrating a magnetic card read head and an amplifier circuit for producing a square wave output signal when a magnetic stripe card is swiped across the read head.

FIG. 2 illustrates details of the amplifier circuit 12 for use with the M68HC11 Evaluation Board. An output terminal of read head 11 is coupled through a 0.1 µF capacitor 26 to an input of inverting amplifier 28. An output of inverting amplifier 28 is coupled through the parallel combination of a 1.6M resistor 30 and a 0.01 µF capacitor 32 to the input of inverting amplifier 28. The output of inverting amplifier 28 is also coupled to an input of inverting amplifier 34. An output of inverting amplifier 34 is coupled through a 0.0068 µF capacitor 36 to the input of inverting amplifier 34. The output of inverting amplifier 34 is also coupled to an input of inverting amplifier 38. An output of inverting amplifier 38 is coupled to an input of inverting amplifier 40. An output of inverting amplifier 40 is coupled to connector P1-34 of the M68HC11 Evaluation Board. Illustratively, inverting amplifiers 28, 34, 38, and 40 are inverting amplifiers U1A, U1B, U1C and U1D, respectively, of a CD4049UB inverter chip available from RCA. Pin numbers in FIG. 2 correspond to pin numbers on this chip. It is understood that another equivalent inverter chip may be used. Pin 1 of inverting amplifier 38 is coupled to VDD and to connector P1-26 of the M68HC11 Evaluation Board. Pin 8 of inverting amplifier 38 is coupled to ground and to connector P1-1 of the M68HC11 Evaluation Board.

Figure 3:
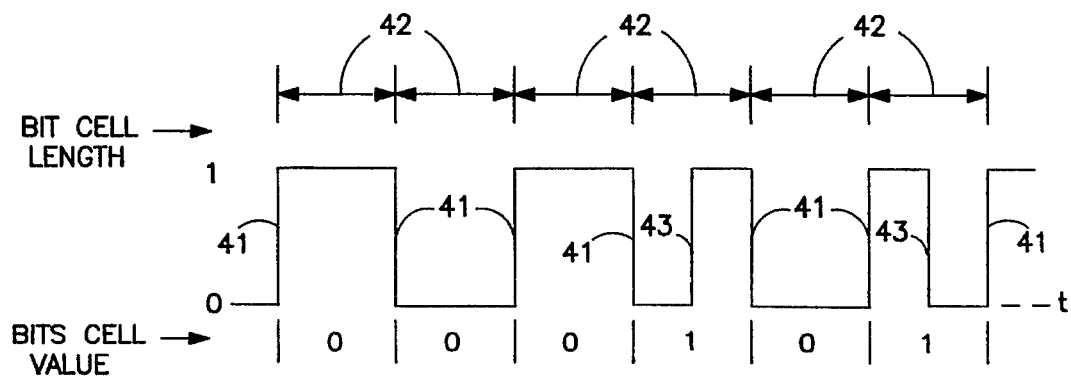
FIG. 3 is a sample output signal from the read head and amplifier circuit of FIG. 2 illustrating a plurality of bit cells including both logical zero binary data values and logical one binary data values.

The output signal from pin 6 of inverting amplifier 40 is a square wave output signal when a magnetic stripe card is swiped across read head 11. An example of the output from amplifier circuit 12 is illustrated in FIG. 3. The length or time of each bit cell is illustrated by dimensions 42. Each voltage transition in the output signal of FIG. 3 corresponds to a flux reversal on the magnetic stripe card. End edge transitions 41 of each bit cell are clocking transitions for the bit cell. If an edge transition occurs in the middle of a bit cell, such as edge transitions 43, this indicates a logical value one data transition for the particular bit cell. If no intermediate edge transition is present between the clocking transitions of a bit cell the bit cell has a logical value zero. The value of each bit cell 42 is indicated below each bit cell 42 in FIG. 3.

The apparatus 10 of the present invention detects whether each bit cell contains a binary value zero or a binary value one by calculating the distance (or time interval) from a leading clocking edge transition of a bit cell to the next two edge transitions in the output signal from amplifier 12. Processing means 16 determines whether the distance from the leading clocking edge transition to the first edge transition is closer to the predicted bit cell length than the distance from the leading clocking edge transition to the second edge transition. If the distance from the leading clocking edge transition and the first detected edge transition is closer to the predicted bit cell length, then processing means 16 determines that the first edge transition is the second clocking transition of the bit cell and that no interim data transition occurred. Therefore, a logic value zero is assigned to the bit cell. If the distance from the leading clocking edge transition to the second detected edge transition is closer to the predicted bit cell length, then processing means 16 determines that the second edge detected transition is the second clocking transition of the bit cell and that the first detected edge transition was a data transition. Therefore, the bit cell is assigned a logic value one.

Figure 4:
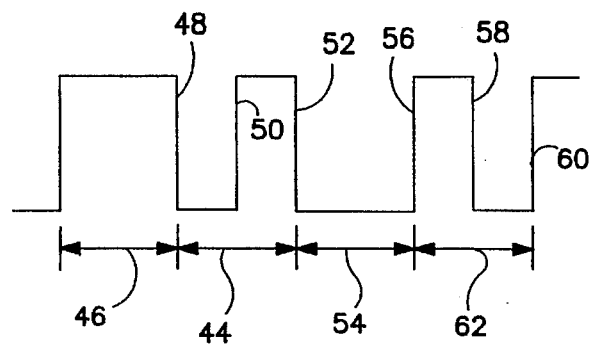
FIG. 4 is a diagrammatical view of a plurality of bit cells illustrating the previous bit cell length, the position of a previous edge, a first edge, and a second edge used to determine whether a particular bit cell contains a logical one data value or a logical zero data value.

FIG. 4 illustrates the terms used to define the present invention. If it is desired to determine the binary logic value for the second bit cell 44, then previous bit cell length is equal to bit cell length 46. As discussed below, the previous bit cell length 46 is used as the predicted bit cell length for the next bit cell 44. The "leading clocking transition" for bit cell 44 is edge transition 48, the "first detected edge transition" is edge transition 50, and the "second detected edge transition" is edge transition 52.

Figure 5:
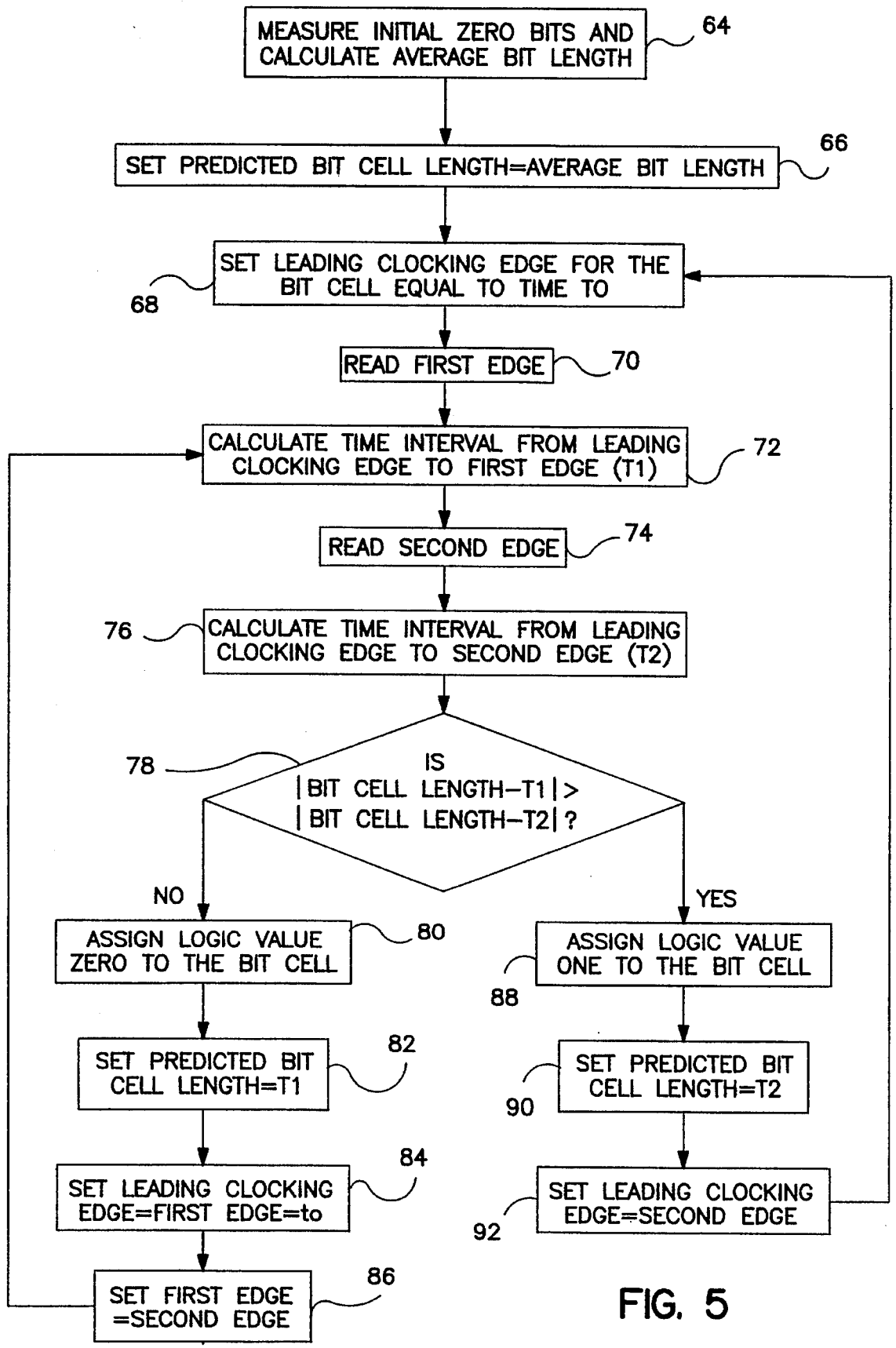
FIG. 5 is a flow chart illustrating the steps performed by a computing device of the present invention to process data and produce a series of binary output values corresponding to the date values encoded on the magnetic stripe card.

FIG. 5 is a flow chart illustrating the steps performed by computing device 24 to assign the series of binary values to the square wave output signal produced by read head 11 and amplifier 12. An edge detector of detecting means 13 triggers on each edge transition of the serial data square wave output signal from amplifier 12. The first several edge transitions of the output signal are ignored because the first several bit lengths on the magnetic stripe card are unreliable due to the acceleration incurred when moving a card from a stand-still position through read head 11. Typically, the leading bit cells on a magnetic stripe card are zeroes to permit the length of the bit cells to be determined. Therefore, the next several bit cells on the magnetic stripe card are assumed to have a binary zero data value. Each edge transition detected by detecting means 13 resets a counter of calculating means 14 which increments until the next edge transition is detected. Each count from the counter is averaged to produce a running average of the bit cell lengths in the initial series of zero value bit cells as illustrated at block 64.

Therefore, the apparatus of the present invention calculates an average bit cell length from the initial zero value bit cells. The bit cell length in the zero bits is the distance or time between each adjacent edge transition. This step of averaging the initial zero bits is illustrated at block 64. Next, processing means 16 sets the predicted bit cell length for the next bit cell equal to the average bit length calculated at block 64 as illustrated at block 66. Processing means 16 then sets the leading clocking edge transition of the next bit cell equal to time T0 by resetting the counter at block 68. Detecting means 13 detects the first detected edge transition after the leading clocking edge transition at block 70. Calculating means 14 then uses the counter to calculate the time interval from the leading clocking edge transition to the first detected edge transition. This time interval is set at T1 as illustrated at block 72. Detecting means 13 then reads the second detected edge transition at block 74 and calculating means 14 calculates the time interval from the leading edge transition at T0 to the second detected edge transition using the counter. This time interval from the leading clocking edge transition to the second detected edge transition is set as T2 as illustrated at block 76. Processing means 16 then determines whether time T1 or time T2 is closer to the predicted bit cell length by determining whether the absolute value of the predicted bit cell length minus T1 is greater than the absolute value of the bit cell length minus T2 as illustrated at block 78. If the absolute value of the predicted bit cell length minus T1 is not greater than the absolute value of the predicted bit cell length minus T2 at block 78, processing means 16 determines that T1 is closer to the predicted bit cell length. Therefore, the first detected edge transition is determined to be the second clocking transition of the bit cell. Accordingly, processing means 16 sets the binary data value of the current bit cell as a logic value zero as indicated at block 80. Processing means 16 then sets the predicted bit cell length for a next bit cell equal to T1 at block 82 and sets the leading clocking edge transition for the next bit cell equal to the first detected edge transition at block 84. The first detected edge is therefore the leading clocking transition edge (time T0) for the next bit cell. Processing means 16 then sets the first detected edge transition for the next bit cell equal to the second edge transition at block 86 and moves to block 72 to calculate the time interval from the leading clocking edge transition to the first detected edge transition for the next bit cell using the new values assigned at blocks 84 and 86, respectively. Processing means 16 then continues down the loop for the next bit cell using the processing technique discussed above.

If the absolute value of the predicted bit cell length minus T1 is greater than the absolute value of the predicted bit cell length minus T2 at block 78, processing means 16 determines that T2 is closer to the predicted bit cell length. Therefore, the second detected edge transition is the second clocking transition of the bit cell and the first edge transition is a data transition for the bit cell. Accordingly, processing means 16 assigns a logic value one to the current bit cell as illustrated at block 88. Processing means 16 then sets the predicted bit cell length for the next bit cell equal to T2 at block 90 and sets the leading clocking edge transition for the next bit cell equal to the second edge transition at block 92. Computing device 24 then returns to block 68 to process the next bit cell using the newly set values.

An example will now be provided illustrating the processing of the sample signal of FIG. 4. Assuming that computing device 24 is processing bit cell 44, the predicted bit cell length (or time interval) is length 46, and the leading edge transition for bit cell 44 is edge transition 48. Detecting means 13 detects the first edge transition 50 and calculating means 14 calculates the time interval (T1) between first detected edge transition 50 and leading clocking edge transition 48 as illustrated at blocks 70 and 72 of FIG. 5. Detecting means 13 then detects the second edge transition 52 and calculating means 14 calculates the time interval (T2) from leading clocking edge transition 48 to second detected edge transition 52 and at blocks 74 and 76. Processing means 16 then determines whether the time interval (T1) from leading clocking edge transition 48 to first detected edge transition 50 is closer to the predicted bit cell length 46 than the time interval (T2) from leading clocking edge transition 48 to second detected edge transition 52 at block 78 of FIG. 5. In bit cell 44, the time interval (T2) from leading clocking edge transition 48 to second detected edge transition 52 is closer to the predicted bit cell length 46. This indicates that edge transition 50 is a data transition for bit cell 44 and not a clocking transition. Therefore, bit cell 44 is assigned a logical value one by processing means 16 at block 88.

The new predicted bit cell length for the next bit cell 54 is set to time interval T2 at block 90 of FIG. 5, and the leading clocking edge transition for use in assigning a data value to the next bit cell 54 is set as second edge transition 52 as illustrated at block 92. Processing means 16 then moves to block 68 in FIG. 5 and sets leading clocking edge transition 52 as time T0 for bit cell 54. Detecting means 13 detects first edge transition 56 and calculating means 14 calculates the time interval (T1) from leading clocking edge transition 52 to the first detected edge transition 56. Detecting means 13 then detects second edge transition 58 and calculating means 14 calculates the time interval (T2) from leading clocking edge transition 52 to second edge transition 58 at blocks 74 and 76 of FIG. 5. Processing means 16 then determines whether time interval (T1) from leading clocking edge transition 52 to first detected edge transition 56 is closer to the predicted bit cell length 44 than the time interval (T2) from leading clocking edge transition 52 to second detected edge transition 58. In this instance, the time interval (T1) from leading clocking edge transition 52 to first detected edge transition 56 is closer to the predicted bit cell length 44. Therefore, processing means 16 assigns a logical value zero to bit cell 54 at block 80 of FIG. 5. Processing means 16 then sets the predicted bit cell length for the next bit cell 62 equal to the time interval (T1) which represents distance 54. Next, processing means 16 sets the leading clocking edge transition for determining the logical value of the next bit cell 62 equal to the first edge transition 56 as illustrated at block 84. Processing means 16 then sets the first detected edge transition for bit cell 62 equal to second edge transition 58 read previously when analyzing bit cell 54 as illustrated at block 86. Processing means 16 then moves to block 72 of FIG. 5 to calculate the time interval (T1) from the new leading clocking edge transition 56 to the new first edge transition 58 for bit cell 62.

Detecting means 13 then reads the second edge transition 60 and calculating means 14 calculates the time interval (T2) from leading clocking edge transition 56 to second detected edge transition 60 at blocks 74 and 76, respectively. Processing means 16 again determines whether the time interval (T1) from leading clocking edge transition 56 to first detected edge transition 58 is closer to the predicted bit cell length 54 than the time interval (T2) from leading clocking edge transition 56 to second detected edge transition 60. For bit cell 62, the time interval (T2) from leading clocking edge transition 56 to second detected edge transition 60 is closer to the predicted bit cell length 54. Therefore, processing means 16 assigns a logical value one to bit cell 62 as illustrated at block 88 of FIG. 5. Computing device 24 continues processing the square wave output signal from amplifier 12 in this manner for all the data on the magnetic stripe card.

Advantageously, the apparatus and method of the present invention rely on actual time interval measurements to determine whether the bit cell is a logical one value bit cell or a logical zero value bit cell. The present invention does not rely on approximations which may lead to inaccuracies. Therefore, the apparatus and method of the present invention reduces decoding errors due to jitter or other causes.

After the series of binary values including logical ones and zeroes are assigned to the output signal from amplifier 12 by processing means 16, examining means 18 of computing device 24 examines the series of binary values to determine whether the particular magnetic stripe card has been authorized to open lock 20. If examining means 18 determines that the magnetic stripe card has authority to open lock 20, a control signal is sent to lock motor controller 22 to open lock 20. If examining means 18 determines that the particular magnetic stripe card does not have authority to open lock 20, no signal is sent to lock motor controller, and lock 20 remains locked. In the illustrated embodiment examining means compares the calculated binary series to authorized values stored in a table in the memory of computing device 24. A programmer can change authorized values stored in the memory.

It is understood that the method and apparatus for decoding bi-phase encoded data may be used to control mechanical or electrical devices other than lock 20. Therefore, the apparatus and method of the present invention is not intended to be limited solely to the control of lock 20.

A preferred embodiment of the computer program for performing the functions discussed above is attached to the present application as Listings 1–4. In operation, an output of amplifier circuit 12 illustrated in FIG. 2 is coupled to the M68HC11 Evaluation Board (EVB) as discussed above. Power is connected to the EVB, and the TERMINAL port of the EVB is connected to the COM1 connector of the computer with a serial cable. The text of attached Listing 1 is then entered on the computer with the file editor and compiled with the M68HC11 macro assembler. The executable is then uploaded to the EVB and run beginning at address 0xC000. The space bar is used to test the program execution. The EVB should return "#NO#". The communication program is then closed. The text of attached Listing 2 is then entered into the BASIC compiler's integrated environment on the computer. The code is then compiled into an executable giving it the name of "READCARD.EXE".

Next, the text of Listing 3 is entered into the BASIC compiler's integrated environment on the computer. The code is then compiled into an executable giving it the name "ALG1.EXE". Next, the text of Listing 4 is entered in the BASIC compiler's integrated environment on the computer. The code is then compiled into an executable giving it the name of "ALG2.EXE". Next, an operator executes the READCARD program. The words "SWIPE CARD" will appear prompting the operator to swipe the magnetic card across the read head 11. The READCARD program will then report the number of edges captured and will also create a file entitled "EDGES.DAT" which contains the time interval between each detected edge transition. Next, the ALG1.EXE program is executed. This program reads the EDGES.DAT file data, decodes the data using steps discussed above, and writes the results to the file "EX_E.DAT". The ALG2.EXE is then executed. This program reads the data stored in EDGES.DAT file, decodes the data, and writes the result into file "EX_F.DAT". The formats of EX_E.DAT and EX_F.DAT are as follows. Columns 1–7 are the binary representation of the bytes on the cards starting with the start sentinel. Columns 10 and 11 are comments "SS" for start sentinel, "ES" for end sentinel and "BP" for bad parity. Columns 13–17 are instantaneous card speed in inches per second. Columns 44–46 indicate the number of the edge where a particular byte starts.

Although the invention has been described in detail with reference to a certain illustrated embodiment, variations and modifications exist within the scope and spirit of the invention as described and defined in the following claims. +v,1-11/2

What is claimed is:

1. A method for decoding bi-phase encoded data, the method comprising the steps of:

establishing a predicted bit cell time interval for a bit cell;

detecting a leading clocking edge transition of the bit cell;

detecting a first edge transition after the leading clocking edge transition;

calculating a first time interval from the leading clocking edge transition to the first detected edge transition;

detecting a second edge transition after the leading clocking edge transition;

calculating a second time interval from the leading clocking edge transition to the second detected edge transition;

comparing both the first time interval and the second time interval the predicted bit cell time interval;

assigning a first binary value to the bit cell if the first time interval is closer to the predicted bit cell time interval than the second time interval; and assigning a second binary value to the bit cell if the second time interval is closer to the predicted bit cell time interval than the first time interval.

2. The method of claim 1, wherein the step of establishing the predicted bit cell time interval includes the steps of calculating an average time interval of a plurality of previous bit cells and setting the predicted bit cell time interval equal to the average time interval.

3. The method of claim 1, further comprising the step of setting a predicted bit cell time interval for a next bit cell equal to the first time interval if the bit cell is assigned a logical zero value during the assigning step.

4. The method of claim 1, further comprising the step of setting a predicted bit cell time interval for a next bit cell equal to the second time interval if the bit cell is assigned a logical one value during the assigning step.

5. The method of claim 1, further comprising the step of setting the first detected edge as the leading clocking transition for a next bit cell if the first time interval is closer to the predicted bit cell time interval than the second time interval.

6. The method of claim 5, further comprising the step of setting the second detected edge as the first detected edge for the next bit cell if the first time interval is closer to the predicted bit cell time interval than the second time interval.

7. The method of claim 1, further comprising the step of setting the second detected edge as the leading clocking transition for a next bit cell if the second time interval distance is closer to the predicted bit cell time interval than the first time interval.

8. The method of claim 1, wherein the first binary value is a logical zero value, and the second binary value is a logical one value.

9. An apparatus for decoding bi-phase encoded data, the apparatus comprising:

a read head for reading data from a magnetic stripe card, the read head generating an output signal including a plurality of edge transitions corresponding to a plurality of flux reversals on the magnetic stripe card;

a computing device including means for establishing a predicted bit cell length for a bit cell; for detecting a leading clocking edge transition of a bit cell, a first edge transition after the leading clocking edge transition, and a second edge transition after the leading clocking edge transition from the output signal; for calculating a first distance from the leading clocking edge transition to the first detected edge transition; for calculating a second distance from the leading clocking edge transition to the second detected edge transition; for comparing both the first distance and the second distance to the predicted bit cell length; and for assigning a binary data value to the bit cell, the computing device assigning a first binary value to the bit cell if the first distance is closer to the predicted bit cell length than the second distance, and the computing device assigning a second binary value to the bit cell if the second distance is closer to the predicted bit cell length than the first distance.

10. The apparatus of claim 9, wherein the computing device includes means for calculating an average length of a plurality of previous bit cells, and for setting the predicted bit cell length equal to the average length.

11. The apparatus of claim 9, wherein the computing device includes means for calculating a length of a previous bit cell, and for setting the predicted bit cell length equal to the length of the previous bit cell.

12. The apparatus of claim 9, the computing device further comprising means for setting a predicted bit cell length for a next bit cell equal to the first distance if the assigning means assigns a logical zero value to the bit cell.

13. The apparatus of claim 9, the computing device further comprising means for setting a predicted bit cell length for a next bit cell equal to the second distance if the assigning means assigns a logical one value to the bit cell.

14. The apparatus of claim 9, the computing device further comprising means for setting the first detected edge as the leading clocking transition for a next bit cell if the assigning means assigns a logical zero value to the bit cell.

15. The apparatus of claim 14, the computing device further comprising means for setting the second detected edge as the first detected edge for the next bit cell if the assigning means assigns a logical zero value to the bit cell.

16. The apparatus of claim 9, the computing device further comprising means for setting the second detected edge as the leading clocking transition for a next bit cell if the assigning means assigns a logical one value to the bit cell.

17. The apparatus of claim 9, wherein the first binary value is a logical zero value, and the second binary value is a logical one value.

18. An apparatus for decoding bi-phase encoded data from a magnetic stripe card to permit an authorized magnetic stripe card to unlock an electronic lock:

a read head for reading data from the magnetic stripe card, the read head generating an output signal including a plurality of edge transitions corresponding to a plurality of flux reversals on the magnetic stripe card;

means coupled to the read head for detecting edge transitions;

means for calculating a time interval between each of the edge transitions;

means for processing the calculated time intervals to produce a series of binary values corresponding to the encoded binary values on the magnetic stripe card, the processing means including means for establishing a predicted bit cell time interval for a bit cell, for calculating a first time interval from a leading clocking edge transition of the bit cell to a first detected edge transition after the leading clocking edge transition, for calculating a second time interval from the leading clocking edge transition to a second detected edge transition after the leading clocking edge transition, for comparing both the first time interval and the second time interval to the predicted bit cell time interval, the processing means assigning a first binary value to the bit cell if the first time interval is closer to the predicted bit cell time interval than the second time interval, and assigning a second binary value to the bit cell if the second time interval is closer to the predicted bit cell time interval than the first time interval;

means for examining the series of binary values from the processing means to determine whether the magnetic stripe card is authorized to open the lock, the examining means generating a control signal; and a lock controller for opening the lock in response to the control signal from the examining means indicating that the magnetic stripe card is authorized to open the lock.

19. The apparatus of claim 18, wherein the means for establishing a predicted bit cell time interval includes means for calculating an average time interval of a plurality of previous bit cells, and for setting the predicted bit cell time interval equal to the average time interval.

20. The apparatus of claim 18, wherein the means for establishing a predicted bit cell time interval includes means for calculating a time interval of a previous bit cell, and for setting the predicted bit cell time interval equal to the time interval of the previous bit cell.

21. The apparatus of claim 18, the processing means further comprising means for setting a predicted bit cell time interval for a next bit cell equal to the first time interval if the processing means assigns a logical zero value to the bit cell.

22. The apparatus of claim 18, the processing means further comprising means for setting a predicted bit cell time interval for a next bit cell equal to the second time interval if the processing means assigns a logical one value to the bit cell.

23. The apparatus of claim 18, the processing means further comprising means for setting the first detected edge as the leading clocking transition for a next bit cell if the processing means assigns a logical zero value to the bit cell.

24. The apparatus of claim 23, the processing means further comprising means for setting the second detected edge as the first detected edge for the next bit cell if the processing means assigns a logical zero value to the bit cell.

25. The apparatus of claim 18, the processing means further comprising means for setting the second detected edge as the leading clocking transition for a next bit cell if the processing means assigns a logical one value to the bit cell.

26. The apparatus of claim 18, wherein the first binary value is a logical zero value, and the second binary value is a logical one value.

* * * * *